(12) United States Patent
Odom

(10) Patent No.: US 6,606,102 B1
(45) Date of Patent: Aug. 12, 2003

(54) OPTIMIZING INTEREST POTENTIAL

(76) Inventor: Gary Odom, 15505 SW. Bulrush La., Tigard, OR (US) 97223

(*) Notice: Subject to any disclaimer, the term of this patent is extended or adjusted under 35 U.S.C. 154(b) by 477 days.

(21) Appl. No.: 09/586,278

(22) Filed: Jun. 2, 2000

(51) Int. Cl.[7] .................................................. G09G 5/00
(52) U.S. Cl. ........................ 345/745; 345/733; 345/747; 345/764; 345/765
(58) Field of Search .................................. 345/744, 968, 345/733, 745, 747, 764, 765, 866, 810, 835; 707/3, 5, 6, 10; 709/201, 202, 203

(56) References Cited

U.S. PATENT DOCUMENTS

| | | | |
|---|---|---|---|
| 5,636,350 A | * 6/1997 | Eick et al. ................... | 345/440 |
| 5,724,488 A | 3/1998 | Prezioso | |
| 5,897,670 A | 4/1999 | Nielsen | |
| 5,933,827 A | 8/1999 | Cole et al. | |
| 5,982,369 A | * 11/1999 | Sciammarella et al. ..... | 345/835 |
| 5,983,219 A | 11/1999 | Danish et al. | |
| 5,991,735 A | 11/1999 | Gerace | |
| 5,999,975 A | * 12/1999 | Kittaka et al. ............... | 709/224 |
| 6,003,046 A | 12/1999 | Nielsen | |
| 6,005,567 A | 12/1999 | Nielsen | |
| 6,006,197 A | 12/1999 | d'Eon et al. | |
| 6,006,218 A | 12/1999 | Breese et al. | |
| 6,006,222 A | 12/1999 | Culliss | |
| 6,021,412 A | 2/2000 | Ho et al. | |
| 6,026,433 A | 2/2000 | D'Arlach et al. | |
| 6,055,542 A | * 4/2000 | Nielsen et al. ........... | 707/104.1 |
| 6,055,543 A | * 4/2000 | Christensen et al. ..... | 707/104.1 |
| 6,335,730 B1 | * 1/2002 | Gould ........................ | 345/784 |

* cited by examiner

*Primary Examiner*—Raymond J. Bayerl
*Assistant Examiner*—Cuong T. Thai

(57) ABSTRACT

Described are methods to accommodate user interests in content available in information-rich software environments. As a dynamic process, user profiles are surreptitiously obtained by discerning and collating user interest based upon patterns of search and selection of displayed descriptor-based content. Based upon encapsulated user profiles, content characteristics of interest to users may be discerned, and content display altered to optimize individual user interest potential.

60 Claims, 11 Drawing Sheets

| 133 | DISPLAY VALUE FACTORS | | 15 | FACTOR DISPLAY VALUE ~37 | |
|---|---|---|---|---|---|
| | | | | HIGH VALUE | LOW VALUE |
| 16 | LAYOUT | LOCATION | 18 | TOP-LEFT | BOTTOM-RIGHT |
| | | SIZE | 19 | BIG | SMALL |
| | | GROUPING | 20 | GROUPED | UNGROUPED |
| 17 | VIVIDNESS | DELINEATION | 21 | DELINEATED | UNDIFFERENTIATED |
| | | COLOR 22 / HUE | 24 | WARM | COOL |
| | | COLOR 22 / SATURATION | 25 | HIGH | LOW |
| | | COLOR 22 / VALUE | 26 | BRIGHT | DARK |
| | | SHAPE | 23 | IRREGULAR | RECTANGULAR |

FIGURE 7

| | GRAPHIC COLOR TYPE (261) | EXAMPLE | INPUT VALUE (262) |
|---|---|---|---|
| 250 | LOW IMPACT BACKGROUND | LIGHT B&W | 0.10 |
| 251 | MID IMPACT BACKGROUND | UNSATURATED COLOR | 0.28 |
| 252 | MID-HIGH BACKGROUND | MEDIUM-DARK SATURATED COLOR | 0.40 |
| 253 | HIGH IMPACT BACKGROUND | BRIGHT SATURATED COLOR | 0.52 |
| 254 | MAX IMPACT BACKGROUND | SATURATED YELLOW BACKGROUND | 0.60 |
| 255 | GRAY SCALE IMAGE | B&W PHOTO | 0.20 |
| 256 | HIGH CONTRAST B&W | B&W BOLD LINE DRAWING | 0.34 |
| 257 | LOW IMPACT COLOR | COLOR (NEWS) PHOTO | 0.50 |
| 258 | MID IMPACT COLOR | SATURATED COLOR PHOTO, COLOR GRAPHIC | 0.70 |
| 259 | HIGH IMPACT COLOR | BOLD, HIGH CONTRAST GRAPHIC | 0.90 |
| 260 | MAX IMPACT COLOR | BOLD, HEAVILY YELLOW GRAPHIC | 1.00 |

FIGURE 8

NOMINAL SCOOP = LAYOUT + VIVIDNESS
    333    16    17

WHERE:
       18   19
LAYOUT = LOCATION + SIZE

VIVIDNESS = DELINEATION + GRAPHIC INTENSITY + ANIMATION
        21      120       121

LOCATION:

122 — OBSCURITY DISTANCE = DISTANCE FROM THE BOTTOM RIGHT CORNER OF A PAGE TO THE BOTTOM RIGHT CORNER OF A CONTENT PACKAGE

123 — LOCATION FACTOR = OBSCURITY DISTANCE / HIGHEST OBSCURITY DISTANCE — 124

125 — RELATIVE LOCATION = LOCATION FACTOR / $\sum$ [ALL LOCATION FACTORS] — 126

18 — LOCATION = RELATIVE LOCATION * LOCATION WEIGHT — 127

SIZE:
         129   130
128 — BOUNDING AREA = WIDTH * HEIGHT
                132
131 — SIZE FACTOR = BOUNDING AREA / LARGEST BOUNDING AREA

133 — RELATIVE SIZE = SIZE FACTOR / $\sum$ [ALL SIZE FACTORS] — 134

19 — SIZE = RELATIVE SIZE * SIZE WEIGHT — 135

DELINEATION:   54   52
20 — GROUPING = MENU ITEM | TAB    ( | = OR) 137
                   138
136 — DELINEATED = GROUPING + HEADLINED + BORDERED

139 — RELATIVE DELINEATION = DELINEATED / $\sum$ [ALL DELINEATED] — 140

21 — DELINEATION = RELATIVE DELINEATION * DELINEATION WEIGHT — 141

FIGURE 9A

GRAPHIC:

150 SINGLE GRAPHIC = GRAPHIC WIDTH[151] * GRAPHIC HEIGHT[152] [154]

153 GRAPHIC AREA = $\sum$ [FOR EACH GRAPHIC: SINGLE GRAPHIC] [156]

155 GRAPHIC FACTOR = GRAPHIC AREA / LARGEST GRAPHIC AREA

157 RELATIVE GRAPHIC = GRAPHIC FACTOR / $\sum$ [ALL GRAPHIC FACTORS] [158]

159 GRAPHIC = RELATIVE GRAPHIC * GRAPHIC WEIGHT [170]

COLOR:

171 COLOR FACTOR = COLOR VALUE[172] / HIGHEST COLOR VALUE[173]

173 RELATIVE COLOR = COLOR FACTOR / $\sum$ [ALL COLOR FACTORS] [174]

175 COLOR INTENSITY = RELATIVE COLOR * COLOR WEIGHT [176]

GRAPHIC INTENSITY:

177 GRAPHIC PRODUCT = GRAPHIC * COLOR INTENSITY

120 GRAPHIC INTENSITY = GRAPHIC PRODUCT * GRAPHIC PRODUCT WEIGHT [178]

ANIMATION:

160 RELATIVE ANIMATION = ANIMATED[161] / $\sum$ [ALL ANIMATED] [162]

121 ANIMATION = RELATIVE ANIMATION * ANIMATION WEIGHT [164]

(NORMALIZED) SCOOP[33] = NOMINAL SCOOP[333] / HIGHEST SCOOP ON THE PAGE[163]

FIGURE 9B

SEARCH:

VALENCE += SEARCH VALUE * SEARCH TERM DISCOUNT FACTOR
(66)    (80)    (81)

SELECTION:

VALENCE += DISCRIMINATION − SELECTION DISTRACTION + CONSUMPTION
(82)    (83)    (84)

ABSENCE OF SELECTION:

VALENCE −= ABSTINENCE
(85)

WHERE:

DISCRIMINATION: (87)

(FOR EACH DESCRIPTOR IN THE SELECTED CONTENT PACKAGE) (89) (90)

(88) DESCRIPTOR UNIQUENESS = # WITHOUT THAT DESCRIPTOR / # OF CONTENT PACKAGES

(91) UNIQUENESS SUM = $\sum$ [FOR EACH DESCRIPTOR IN THE SELECTED CONTENT PACKAGE: DESCRIPTOR UNIQUENESS] (92)

(93) PROXIMITY = UNIQUENESS SUM / # OF CONTENT PACKAGES

DISCRIMINATION = PROXIMITY * DISCRIMINATION WEIGHT (94)

ABSTINENCE: (97)

(FOR EACH DESCRIPTOR NOT SELECTED) (102)

(101) ABSTINENCE UNIQUENESS SUM = $\sum$ [FOR EACH DESCRIPTOR NOT SELECTED: DESCRIPTOR UNIQUENESS]

(103) RELATIVE ABSTINENCE = ABSTINENCE UNIQUENESS SUM / # OF CONTENT PACKAGES

ABSTINENCE = RELATIVE ABSTINENCE * ABSTINENCE WEIGHT (104)

FIGURE 13A

CONSUMPTION (FOR A READABLE PAGE): 96    98

95 WITNESS = MAX [MEASURED WITNESS | CONSUMPTION REQUIREMENT]

99 CONSUMPTION PERCENTILE = WITNESS / CONSUMPTION REQUIREMENT

84 CONSUMPTION = CONSUMPTION PERCENTILE * CONSUMPTION WEIGHT   100

DISTRACTION:

110 PAGE SCOOP = $\sum$ [FOR EACH CONTENT PACKAGE: SCOOP]   106

105 RELATIVE SCOOP = SELECTED CONTENT PACKAGE SCOOP / PAGE SCOOP

83 DISTRACTION = RELATIVE SCOOP * DISTRACTION WEIGHT   107

FIGURE 13B

AGGREGATION ANALYSES:   112

111 DESCRIPTOR VALENCE AGGREGATION = $\sum$ [FOR EACH USER, FOR A DESCRIPTOR: VALENCE]

113 CONTENT VALENCE AGGREGATION = $\sum$ [FOR EACH DESCRIPTOR IN THE CONTENT PACKAGE:   114
    DESCRIPTOR VALENCE AGGREGATION]

115 DESCRIPTOR USER AGGREGATION = LIST [FOR A DESCRIPTOR: USERS]   116

117 CONTENT USER AGGREGATION = LIST [FOR VALENCE TO EACH DESCRIPTOR IN THE CONTENT   118
    PACKAGE: USERS]

FIGURE 14

OPTIMIZING INTEREST POTENTIAL

TECHNICAL FIELD

The invention relates to methods and apparatus for assessing displayed content on data processing systems, collating user interest in displayed content, and altering content to optimize user interest potential.

BACKGROUND OF THE INVENTION

Content-rich software environments face the daunting task of optimally organizing information of interest to individual users. The ideal solution would be self-organizing display based upon expressed user interest. Relying upon user surveys is impractical, as content may be too diverse or change frequently, and users are anyway often reluctant or unwilling to answer questionnaires for a variety of reasons, including tediousness and privacy concerns. There has been an unmet need to organize and alter display content for individuals so as to optimize user interest potential based upon surreptitious observation of patterns of expressed interest in content.

SUMMARY OF THE INVENTION

An essential aspect of this invention is providing descriptors of displayed content such that user exploration of content reveals interest in or avoidance of certain content. Another aspect is attribution of the relative display value of content. Another aspect is encapsulation of user interest and disinterest (valence) based upon selection or absence of selection of content. Another aspect is encapsulation of user valence in content based upon search nomenclature. Another aspect is indirect discernment of individual user valence for the separate characteristics of displayed content. Another aspect is grouping of users by characteristics of expressed interest, and aggregation of characteristics of interest to users. Another aspect are ways to arrange content display to optimize user interest and convenience based upon observed patterns.

BRIEF DESCRIPTION OF THE DRAWINGS

FIG. 7 depicts display value factors.

FIG. 8 is a table of graphic color types.

FIGS. 9a, 9b depict quantitative methods for content package display value.

FIGS. 13a, 13b depict quantitative methods for valence.

FIG. 14 depicts quantitative methods for aggregation analyses.

DETAILED DESCRIPTION OF THE INVENTION

Figure 1:
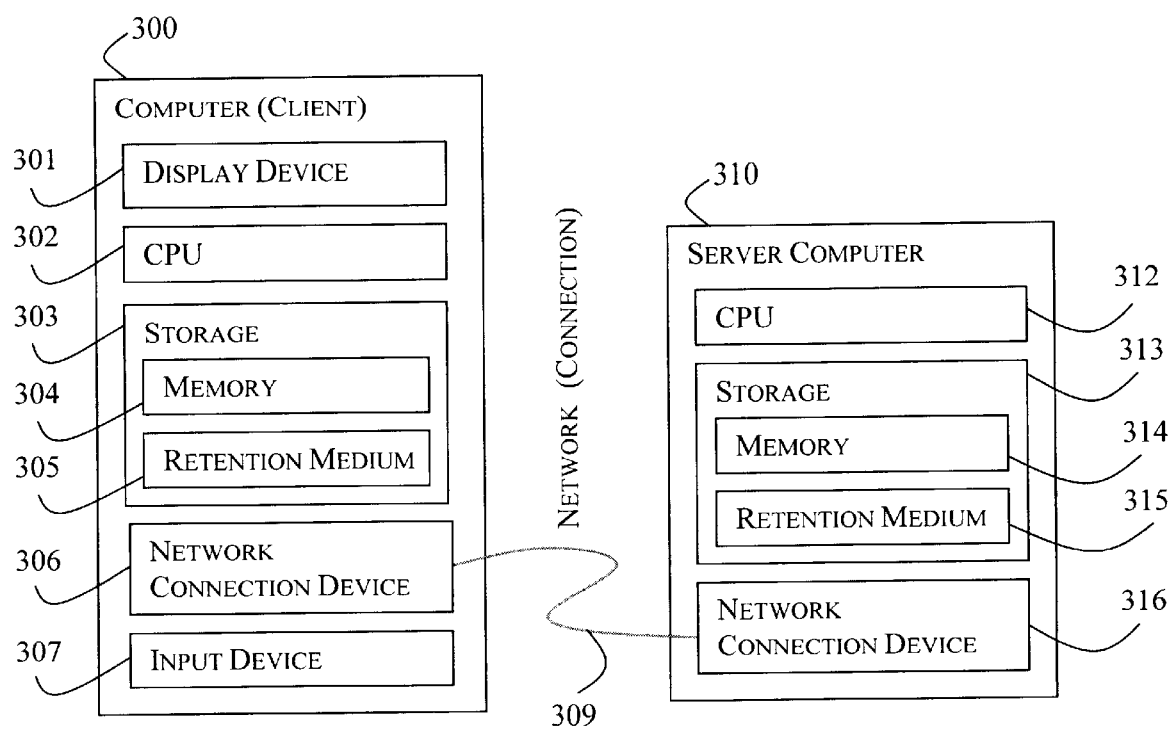
FIG. 1 is a block diagram of computers suitable for practicing the invention.

FIG. 1 is a block diagram of a client computer 300 connected to a server computer 310 through a network 309. A client computer 300, more simply called a client or a computer, comprises at least a CPU 302; storage 303, which comprises memory 304 and optionally one or more devices with retention medium(s) 305 such as hard disks, diskettes, compact disks, or tape; a display device 301; and one or more input devices 307, such a keyboard and/or mouse. A display device 301 is capable of dynamically displaying different displays of information. The aggregate of information displayed on a display device is called display content 10. As a client 300 in a network, a computer 300 also comprises a device for connection to a network 306. A server computer 310, more simply called a server, comprises at least a CPU 312; storage 313, which may comprise memory 314, and possibly one or more devices with retention medium(s) 315 such as hard disks, diskettes, compact disks, or tape; and a device for connection to a network 316. Related to the invention, a client 300 primarily receives data. A user is a user of a client computer 300. Related to the invention, a server 310 primarily transmits data to be received by one or more clients 300. A network 309 may be any means by which one or more clients 300 are connected to one or more servers 310 for data transfer. A client-server environment is a setup whereupon one or more clients 300 are connected to one or more servers 310 through a network 309.

Figure 2:
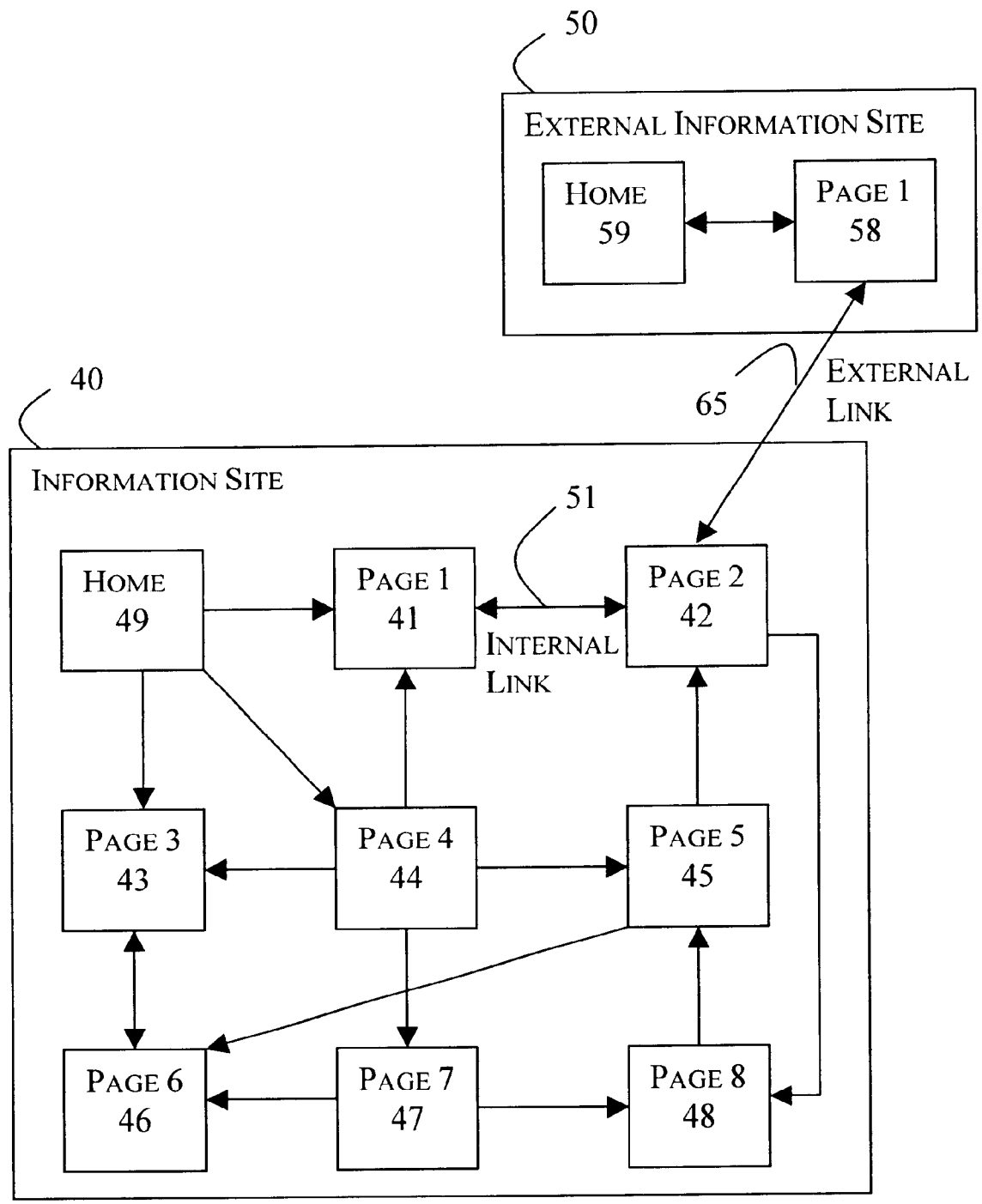
FIG. 2 depicts information sites.

FIG. 2 depicts an information site 40. An information site 40 comprises a set of display pages 10, including at least one initial display, called a home page 49, and other pages (42–48) linked to each other (example internal link 51) and, directly or indirectly, to the home page 49. A display page 10 is also called a multiple content display 10, as each display page 10 displays multiple packages of content 11 that correspond to separate units of information.

Figure 3:
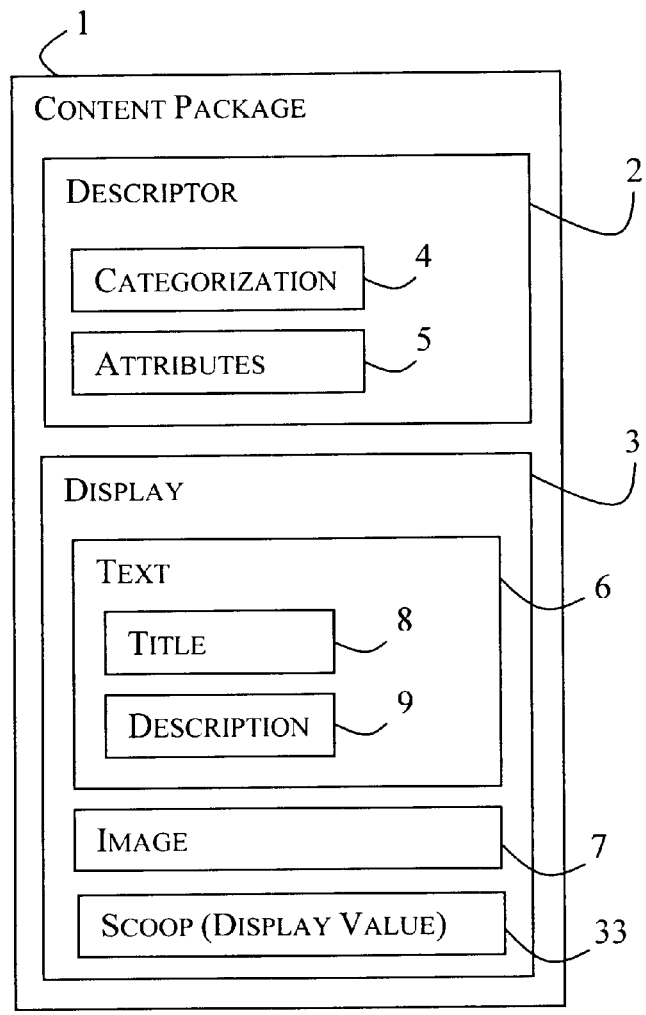
FIG. 3 depicts aspects of a content package.

A topically and geographically identifiable subset of content 11 on a display page 10 is called a content package 1. As shown in FIG. 3, a content package 1 comprises two aspects: descriptor 2 and display 3.

Figure 4:
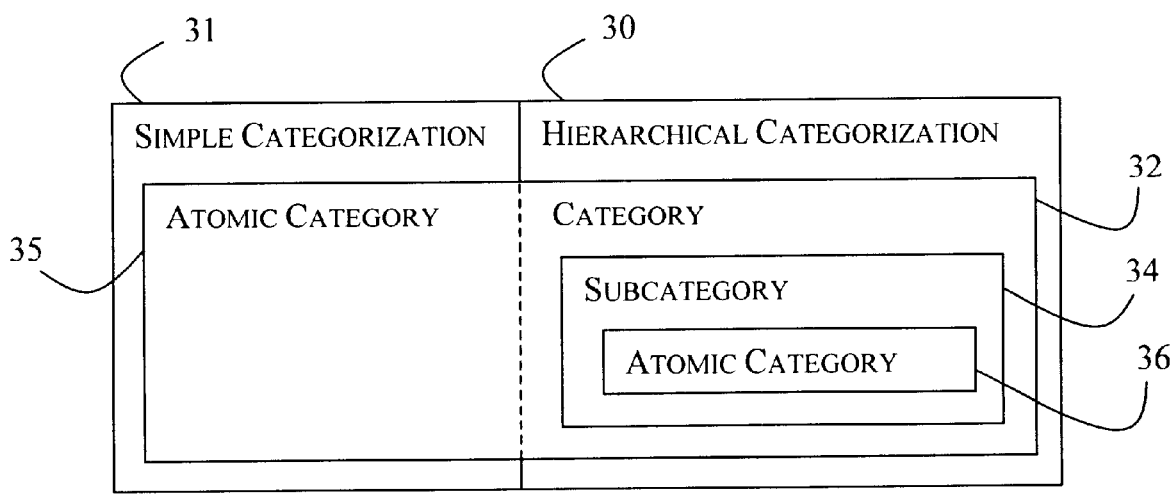
FIG. 4 depicts categorization.

A content descriptor 2 is taxonomic data related to a content package 1. It is essential for the invention that a content package 1 has descriptor data 2. In the preferred embodiment, a descriptor 2 comprises categorization 4 and attributes 5. Categorization 4 is an ordering of content. As shown in FIG. 4, categorization 4 may be hierarchical 30 or non-hierarchical 31. Hierarchical categorization 30 may comprise categories 32 and subcategories 34, while non-hierarchical categorization 31 has only atomic categories 35. The lowest level category in hierarchical categorization 30 is an atomic category 36. In the preferred embodiment, categorization 4 comprises at least some hierarchical categories 30. In an alternative embodiment, categorization 4 may be entirely non-hierarchical 31. Attributes 5 qualify categorization 4. Attributes 5 may have their own categories. Attributes 5 may be atomized to possible options. Attributes 5 are nonexclusive, and the same attribute may apply to different categories. A content package 1 typically has several attributes 5, sometimes even multiple options of the same attribute 5 (such as color). In an alternative embodiment, descriptor data 2 may lack categorization 4 or attributes 5.

Content display 3 is a bounded visual display of information related to a content package 1. A content display 3 may comprise text 6, including title 8 and/or description 9, and/or visual and/or audio elements 7. Visual and/or audio elements 7 are for simplicity's sake referred to as image 7. A simple content display 3 may be only a text title 6 or image 7.

FIG. 14 is an example of descriptors 2 for jewelry 200. Jewelry categories 201, which are hierarchical 30, may comprise earring 202, bracelet 209, necklace 210 and ring 211. Earring subcategories 34 may comprise pierced 203 and clip 208. Pierced earrings 203 may comprise hanging 204 and post 207 categories 34. Hanging pierced earrings 204 may comprise French wire 205 and lever back 206 atomic categories 36. Categories of jewelry attributes may comprise metal 213, stone 226, price 227, brand 228 and ethnicity 229. Attributes 5 may have categories, such as metal 213 in this example. Metals commonly used in jewelry include gold 214, silver 224 and platinum 225. Gold 214 is an attribute 5 unto itself, even though the characteristics of gold 214 may be further specified. For example, a consumer may prefer gold 214 to silver 224, regardless of further specification. Gold 214 has two defining categories of attribute: color 220 and purity 214. Common gold purities 215 comprise 24 karat 216, 18 karat 217, 14 karat 218, and the least expensive commonly available in the U.S., 10 karat 219. Gold colors 220 comprise yellow 222, white 221 and rose 223. In the figure, price 227 is shown as a single attribute, but, in the case of jewelry 200, has distinguishable variants: high and low. Most often consumers have a preference for lower-priced goods and services of the same function, but certain goods such as jewelry also posses to some status value, or "snob appeal", where consumers may actually prefer higher-priced items. In this instance there may be two atomized price attributes 5: low price and high price. A user of a jewelry information site may express interest in high-priced or low-priced jewelry almost exclusively; in the invention, a user expressing interest 62 in both high- and low-priced jewelry effectively eliminates price 227 as a discerning attribute qualifying that user's interests.

Figure 5:
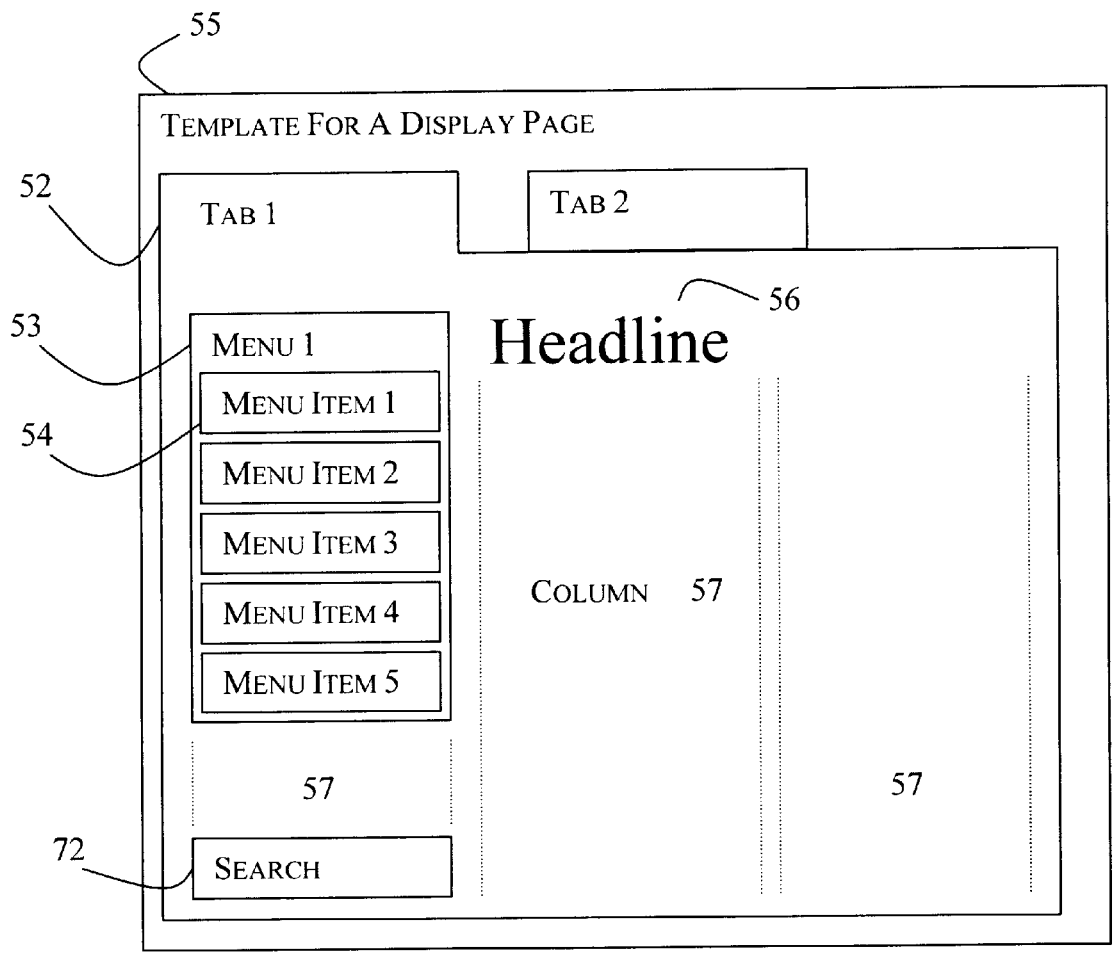
FIG. 5 depicts an example display page template.

Typically, a set of templates 55 are used for display pages 10 in an information site 40. FIG. 5 depicts an example template 55. A template 55 for a page 10 typically comprises at least some consistent content packages 11. A menu 53, for example, is typically in the same place, as users would find it disconcerting to see a menu 53 in different places on different pages 10, or sometimes provide a menu 53 and sometimes not, though all pages 10 , typically pages 10 indirectly linked to the home page 49, may not have a menu 53. Tabs 52 have become a common way to provide quick access and delineate multiple home pages 49 in a site 40 that comprises different categories 4 of content 11. Invisible placement guides, such as columns 57, may be used in a template 55 to structure content package 1 display which varies on a per page 10 basis. Search capability 59 is common for information sites 40, and a valuable assist in constructing a user profile 63.

Figure 6:
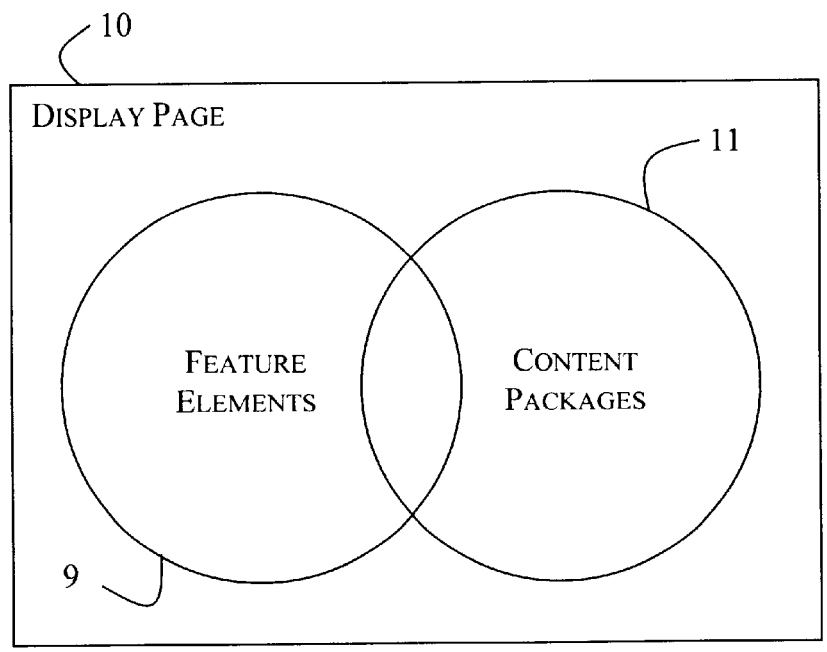
FIG. 6 depicts display page components.

It is essential for the invention that at least one display page 10 in an information site 40 comprise multiple content packages 11 available for user selection. Content packages 11 on a page 10 are more simply called display content 11 or, most simply, content 11. FIG. 6 depicts that the set of feature elements 9 overlaps the set of content packages 11. Feature elements 9 may provide a venue for presentation of content packages 11, but content packages 11 also incorporate feature elements 9. In other words, a content package 1 may both have feature elements 9 and may be given heightened or lessened display value 33 by feature elements 9 external to the content package 1. For example, a menu item 54, as depicted in FIG. 4, may be a relatively nondescript text title 8, but is given augmented display value 33 by virtue of incorporation into a menu 53.

FIG. 7 depicts factors of display value 15. Content package display value 33 is a relative measure of visual prominence of a content package 1 on a display page 10. High display value is visible prominence, while low display value is obscurity. Display value 33 is also called scoop 33 (because it catches the eye). The factors determining display value 15 comprise layout 16 and vividness 17, which collectively constitute feature elements 9. Layout 16 is overall arrangement of content packages 11. Aspects of layout 16 include location 18, size 19 and grouping 20. Location 18 is the relative location on a page 10. Size 19 is the relative area of a content package 1 on a page 10. Grouping 20 relates to visible organization of content packages 11. Vividness 17 includes delineation 21, color 22 and shape 23. Delineation 21 refers to whether and how a content package 1 is differentiated from others around it 11. Color 25 comprises hue 26, saturation 27 and value 28. Shape 21 is the regularity of a content package 1. Illustrative factor display value indicators 37 are also shown in FIG. 7. Specific factor display values 37 may be affected by cultural and individual preferences, and especially usage in context.

There are consistencies in calculations related to scoop 33 used in the preferred embodiment. First, a scale used in measurement should be consistent throughout a site 40, and must be consistent within the scope of equivalent measurements, but the scale employed is otherwise optional, as relative, not absolute, derived values are used. Second, weights are used in calculations to adjust relative factors. Third, alternative embodiments may employ different factors or scales or values or steps or calculation.

Content package scoop 33 is a composite of display value factors 15. The invention employs a quantitative method to ascribe content package scoop 33. The preferred embodiment uses, where convenient, direct display value factors 15 or, if direct measurement is not readily available, quantifiable surrogates of display value factors 15; alternative embodiments may do likewise. In the preferred embodiment, for example, shape 23 is not directly incorporated in calculating scoop 33.

Nominal scoop 333 equals layout 16 plus vividness 17. Layout 16 equals location 18 plus size 19. Vividness 17 equals delineation 21 plus graphic intensity 120 plus animation 121.

In the preferred embodiment, obscurity distance 122 for a content package 1 is the distance from the bottom right corner of a display page 10 to the bottom right corner of the content package 1. The preferred embodiment assumes the top-left corner of a page is the best page location, all other display value factors 15 being constant. An alternative embodiment may make a different assumption about best page location, and adjust obscurity distance 122 measurement accordingly. Location factor 123 is obscurity distance 122 divided by the highest obscurity distance 124 for content on the page 11. The content package 1 with the best location would have the highest obscurity distance 124. Relative location 125 is location factor 123 divided by the sum of all location factors 126. Location 18 is location factor 123 times location weight 127.

The bounding area 128 for a content package 1 is its width 129 times height 130. Size factor 131 is bounding area 128 divided by the largest bounding area of content packages on the page 132. Relative size 133 is size factor 131 divided by the sum of all size factors 134. Size 19 is relative size 133 times size weight 135.

Grouping 20 is a measure of visual prominence based upon a content package 1 being incorporated into an overarching visual structure. Grouping 20 is one if an item is grouped, zero if not. In the preferred embodiment, if a content package 1 is a menu item 54 or a tab 52, grouped 136 is one; otherwise zero. An alternative embodiment may have another grouping mechanism that should be considered to set grouping 20. While grouping is a layout factor 16, it also provides delineation 21. In the preferred embodiment, grouping 20 is incorporated into quantitative calculation of delineation 21. In an alternative embodiment, grouping 20 may be factored into scoop 33 differently.

Delineated 136 equals grouping 20 plus headlining 137 plus bordered 138. An alternative embodiment may include underlining or other delineation means in calculating delineated 136. If the content package 1 has a headline, the value of headlined 137 is one; otherwise zero. If the content package 1 has a bordered 138 around it, the value of bordered 138 is one; otherwise zero. Relative delineation 139 is delineated 136 divided by the sum of all delineated 140. Delineation 21 is relative delineation 139 times delineation weight 141.

Graphic intensity 120 as a factor of vividness 17 is conceptually encapsulated in the preferred embodiment as a product of the area of content package display graphic image(s) 153 times the average color intensity of the graphic (s) 175. The preferred embodiment uses the bounding boxes of graphics in a content package 1 as a measure of graphic area 153. The graphic size for a single graphic image 150 is its graphic width 151 times graphic height 152. Graphic area 153 is the sum of the graphic sizes of all single graphics 150 in a content package 1. It is a common technique to create non-rectangular graphics using contiguous multiple rectangular graphics. Graphic factor 155 is graphic area 153 divided by the largest graphic area of content packages on the page 156. Relative graphic 157 is graphic factor 155 divided by the sum of all graphic factors 158. Graphic 159 is relative graphic 157 times graphic weight 170.

Color 22 is a significant display value factor 15. Relative color intensity of graphics on a page 10 adds another dimension to quantification of vividness 17. Among hue 24, saturation 25 and value 26, value 26 is most significant, followed by saturation 25, then hue 24. For hue 24, high to low value generally ranges from warm colors to cool colors (yellow & red to green & blue). For saturation 25 and value 26, display value 33 positively correlates to saturation 25 and value 26 values. Color display value analysis for content 11 with graphic images is done for each color factor 17 using a consistent scale. In the preferred embodiment, an input color value 262 quantifies color value 172 for the graphic content of a content package 159. FIG. 8 gives the preferred embodiment scale for color input value 262. For a content package 1 with multiple graphics, color value 172 may be a weighted average (by area) of color values for each single graphic 150. If graphic intensity would differ greatly between images within a content package 1, separate graphic intensity analysis may be performed for separate graphics as appropriate and summed for content package graphic intensity 120.

In an alternative embodiment, cumulative pixel by pixel scan analysis of bitmap graphics may be the basis for automated quantitative measure of color value 172. In this alternative embodiment, pixel color intensity is a product of banded trade-off scales of color saturation 25 and value 26 times hue 24, where hue 24 is quantified by relative hue display value. Color dispersion of a graphic is factored in as a measure of contrast (contrast being an aspect of delineation 21 that is scoop 33 enhancing) to quantify color value 172.

Color factor 171 is color value 172 divided by the highest color value of content packages on the page 173. Relative color 173 is color factor 171 divided by the sum of all color factors 174. Color intensity 175 is relative color 173 times color weight 176.

Graphic product 177 is graphic times color intensity 175. Graphic intensity 120 is graphic product 177 times graphic product weight 178.

Though not in the preferred embodiment, graphic intensity analysis may also be appropriate for vivid headline text. Such headline text is typically more vivid low scoop backgrounds, but less vivid than high scoop images. As an extension of this idea, in an alternative embodiment, an entire content package 1 may be subject to vividness 17 analysis using the methods described.

Animation 121 by itself yields significantly enhanced display value 33. Animated 161 is one if an item is animated, 0 (zero) if not. Relative animation 160 is animated 161 divided by the sum of all animated 162. Animation 121 is relative animation 160 times animation weight 164. Animation 121 may not be germane for some sites 40.

For optional feature elements 9, the method of calculation in the preferred embodiment using relative factors and measures quantifies the concept of relative distinction. For example, the value of animation 121 as a feature element 9 distinguishing a content package 1 from others is diminished as more content packages on a page 11 have animation.

Normalized scoop 33 is a variant of nominal scoop 333, mathematically convenient because the range of normalized scoop 33 is zero to one. Scoop 33 is derived by dividing nominal scoop 333 by the highest scoop on the page 163.

Scoop for a given page 110 with the same feature elements 9 may be considered constant. Typically some feature elements 9 on a page 10 vary, even though the same template 55 may be used. This is because a content package 1 may have its own feature elements 9, hence may have a unique scoop 33. For approximation purposes, scoop for a given template 110 may be considered constant unless the scoops 33 of content packages 11 in the same location 18 vary significantly.

A display page 10 may have one or more content packages 11 with an external link 65, that is, a link 65 to a page 58 on an external site 50. Advertising for other sites 50 is an example. If a content package 1 is identifiably exogenous, it may be disregarded it for page scoop analysis 110. Alternately, a content package 1 with an external link 65 may be incorporated if descriptors 2 exist that allow profile analysis, and that content package 1 is considered relevant.

Figure 10:
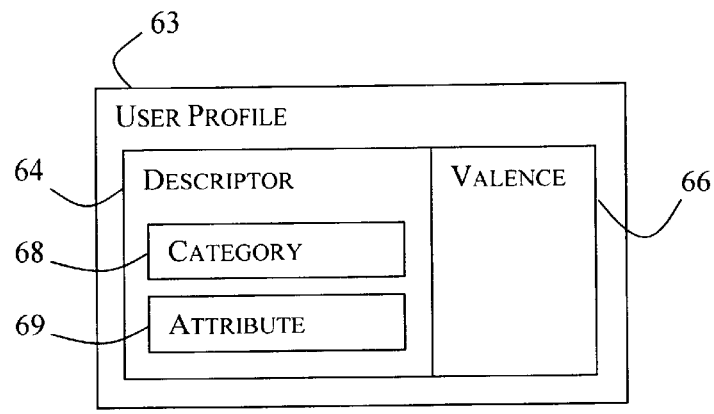
FIG. 10 depicts a user profile.
Figure 11:
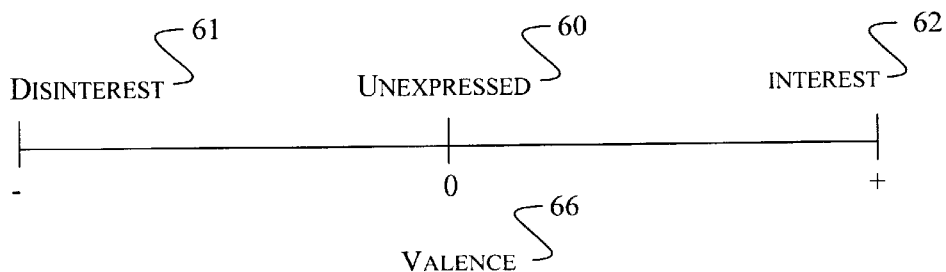
FIG. 11 depicts valence.

Individual user profiles 63 are essential to the invention. A user profile 63, depicted in FIG. 10, encapsulates a set of valences 66 to descriptors 64 (categories 68 and attributes 69) for a particular user. User profile descriptors 64 map to content package descriptors 2. Valence 66, also depicted in FIG. 11, is a measure of user interest 62 and possibly disinterest 61 to content descriptors 2. In the preferred embodiment, valence 66 is a quantitative measure to each tracked descriptor 64, but in a simpler alternative embodiment, valence 66 may be indicated by the presence of tracked descriptors 64 without quantitative measure. In the preferred embodiment, valence 66 may be positive or negative: positive valence is interest 62, where higher (more positive) valence is stronger appeal; negative valence is disinterest 61, where lower (more negative) valence is stronger aversion. Zero valence 60 is non-interest or unexpressed interest. In the preferred embodiment, disinterest 61 is tracked in a user profile 63. In an alternative embodiment, only interest 62 may be tracked.

A user profile 63 may be stored in whole or part on a client 300 or server 310, depending upon the embodiment. User identification may transpire using stored data on a client 300, such as a cookie commonly used with Internet web site browsers, or through account authorization using a client 300 or server 310 based program.

Figure 12:
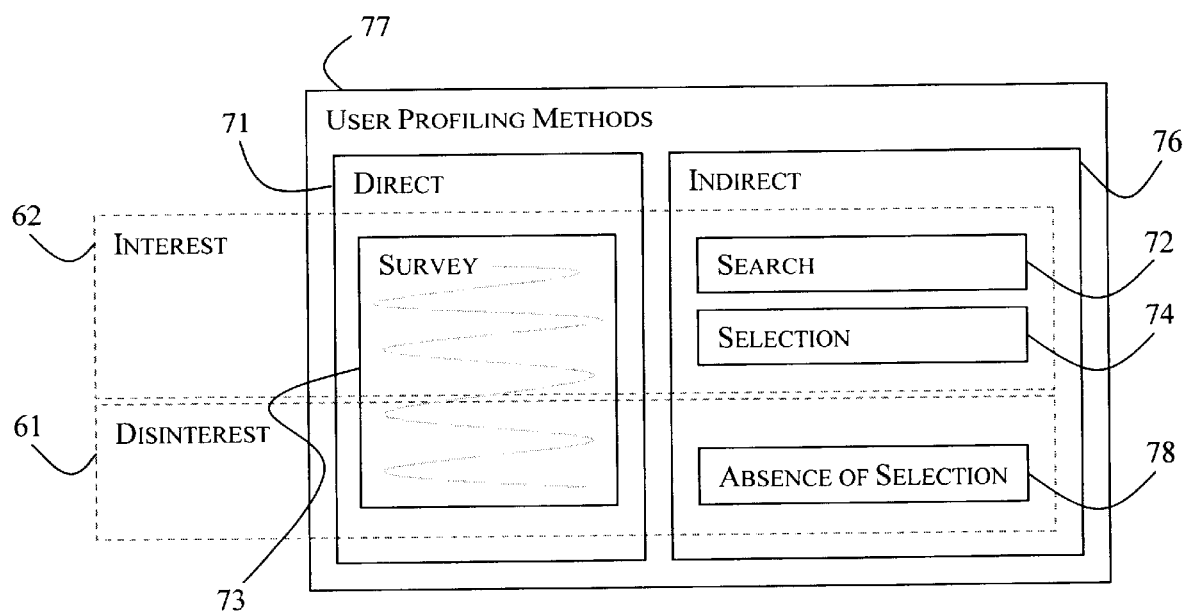
FIG. 12 depicts user profiling methods.
Figure 15:
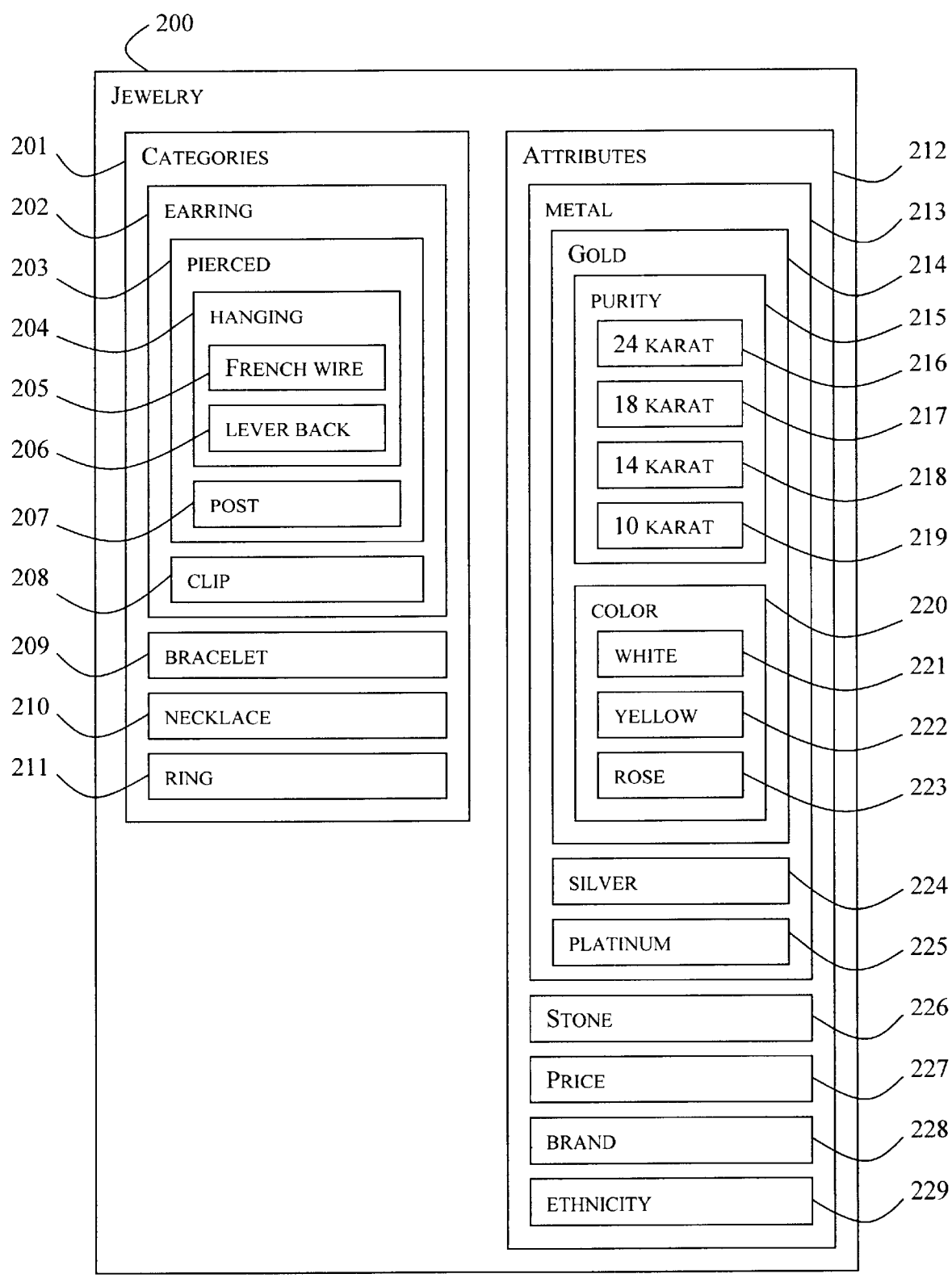
FIG. 15 depicts an example of descriptors.

As depicted in FIG. 12, a user profile 63 may be discovered through two methods 77: direct 71 and indirect 76. Direct profiling 71 is directly asking a user for interests 62, and possibly disinterests 61. A survey 73 or questionnaire is a direct profiling method 71, where a user registers valence 66 directly, comprising interests 62 and possibly disinterests 61. Indirect profiling 76 is incrementally discovering valence 66 through a user's actions. With multiple content packages 11 on a display page 10 available for selection 74, a user reveals interests 62 through selection 74, and by consistency through time, disinterests 61 by lack of selection 78. Accumulating such choices is an indirect profiling method 76. Both selection 74 and absence of selection 78 reveal interest 62 and disinterest 61 respectively, so in the preferred embodiment a user profile 63 is constructed by tracking both selection 74 and absence of selection 78. Using indirect profiling 76 in the preferred embodiment, from an starting point of unexpressed interest (zero) 60 for any descriptor 64, every time a user makes a content package selection 74, the valence 66 of descriptors 64 in that user's profile 63 that apply to the content package selected 74 are credited, and valence 66 of descriptors 64 not selected 78 are debited. An alternative embodiment may only track selection 74, and thus only affirmative selections 74 or choices are credited. Using direct profiling 71 in the preferred embodiment, the valence 66 of descriptors 64 in a user profile 63 that apply to an affirmative choice 74 are credited, and valence 66 of alternate descriptors 64 not chosen 78 are debited. The quantitative methods used with indirect profiling 76 in the preferred embodiment to alter descriptor valence 66 are given in FIGS. 13*a* and 13*b*, and described below. Different embodiments may use different factors or steps to profile 77.

Besides its utility to users, search 72 within an information site 40 is a coveted asset in constructing a user profile 63, as a user reveals interest 62 directly. In the preferred embodiment, incremental valence 66 for search 72 is a product of search value 80 times search discount factor 81. If a search term does not exactly match the descriptor 64, a search term may be associated with a descriptor 64 using textual matching or a dictionary of associative words to descriptors 64 (textual fuzzy logic). If the search term / descriptor 64 match is exact, the search term discount factor 81 is one; if the match is not exact, the search term discount factor 81 may be set by default to 0.5 (one-half), or if fuzzy logic is used, a fractional surety measure of correctly associating the search term to a descriptor 64 may be used as search term discount factor 81.

Proximity 93 is a measure of closeness of content package descriptors 2 on a display page 10. Uniqueness is the inverse of proximity 93. The greater the number of content packages 11 with overlap of descriptors 2, the higher the proximity 93; the less overlap, the more unique. Proximity 93 (or uniqueness) provides a basis to measure discrimination 82. Discrimination 82 is a measure of user selection in relative proximity 93. In other words, discrimination 82 is a measure of user choosiness. There are a few steps in the preferred method to measure discrimination 82 for a descriptor 2 in a selected content package 87. A descriptor's uniqueness 88 may be measured by dividing the number of content packages on the page not having the target descriptor 89 by the number of content packages on a page go. A content package's uniqueness sum 91 may be measured by cumulative summation of descriptor uniqueness 88 for each descriptor 2 applying to that content package 92. Proximity 93, which is relative to other content packages 11 on a page 10, is the content package's uniqueness sum 91 divided by the number of content packages on the page go. Discrimination 82 is proximity 93 times discrimination weight 94.

Abstinence 85 is a measure of relative user apathy, the flip side of discrimination 82, and is calculated similarly to discrimination 82. Abstinence 85 applies only to those descriptors not selected 97; descriptors selected 87 are not used in calculation of abstinence 85. Abstinence uniqueness sum 101 is the sum of descriptor uniqueness 88 for each descriptor not selected 102. Relative abstinence 103 is the abstinence uniqueness sum 101 divided by the number of content packages on the page go. Like proximity 93, relative abstinence 103 is a relative measure. Abstinence 85 is relative abstinence 103 times the abstinence weight 104.

In calculating discrimination 82 and abstinence 85, the preferred embodiment is to use only the lowest level of categorization 4 that applies to the target content package 1. This precludes categorization 4 from being too heavily weighted in calculation relative to attributes 5. In the preferred embodiment, for selection 74 related to a hierarchical categorization 30, once the incremental valence 66 for a subcategory 34 descriptor 64 has been calculated, its next higher category 32 may be credited with one-half the incremental valence 66 related to discrimination 82 or abstinence 85. One implication is that user profile descriptors 64 map to content package descriptors 2 accordingly.

Decisiveness is a measure of quickness in selection 74, how well a user knows what s/he wants. Vacillation signifies browsing without strong interest, while decisiveness signifies intention. One way to measure decisiveness is to measure duration between page display and user selection 74, and apply a metric based upon the complexity of a page 10, using the number of content packages go as indicative of complexity. Quantitatively, decisiveness is of minor significance, but may be revealing. Like discrimination 82, decisiveness is an augmentative factor. Decisiveness is not used in the preferred embodiment, but may be accounted for in an alternative embodiment.

Consumption 84 may signal different forms of success for different types of information sites 40. For a sales site, consumption 84 may mean purchasing merchandise or a service represented by a content package 1. For a sales site, in the preferred embodiment, consumption 84 is achieved if a purchase decision is positively indicated, even if that decision is later rescinded. After all, a high level of interest 62 was indicated, even if a trade-off was later made that eliminated or deferred purchase. For a non-sale site, consumption may mean reading (or viewing or hearing) a page 10 displayed as a result of selecting 74 a content package 1. Consumption 84 applies to the descriptors 2 of the content package 1 selected 74 that allow consumption 84. The meaning and measure of consumption 84 for a non-sales site may differ for different media being consumed: one metric for readable print or graphics, another for videos, another for audio, though all are accounted in time measurement. To measure consumption 84 for a readable page on a non-sales site in the preferred embodiment, first measure witness 95, a measure of how much time a user spent on the page generated by content package selection 74 (on the previous page). In the preferred embodiment, measured witness 96 is the duration that a display page 10 is topmost (in other words, consumable). Set Witness 95 to the larger of the measured witness 96 or consumption requirement 98. Divide witness 95 by consumption requirement 98, which is the duration required to consume the information on the selected page, to get the consumption percentile 99. Multiply the consumption percentile 99 by consumption weight 100 to yield consumption 84. To measure consumption 84 for a video or audio, multiply the consumption weight 100 by consumption percentile 99, which in this case is equivalent to the percent watched or listened to respectively.

Decisiveness and consumption 84 are reliant upon time measurements that may not be readily available in some embodiments. While decisiveness is not a particularly significant metric, consumption 84 is very significant. As a work-around to quantify consumption 84 if duration measurement as described is not readily available, use the duration between generation of the consumable page and a change in the topmost page (if available), or generation of the succeeding page (if change of page is not available) as measured witness 96. Decisiveness may be measured similarly. In an alternative embodiment, where measured witness 96 is impractical, consumption may be assumed (set witness 95 to consumption requirement 98) if selection 74 is made.

For indirect profiling 76, scoop 33 is a discount factor for a content package 1. It's relatively easy to see a content package 1 with high display value, harder to find an obscure one. Accordingly, selection 74 of a relatively obscure content package may signify more genuine interest 62, and perhaps the converse. Distraction 83 is a measure of the influence of scoop 33 in prompting user selection 74 of a content package 1. Page scoop 110 is the sum of all content packages' scoops 33 on a page 10. Relative scoop 99 is the target content package's scoop 33 divided by page scoop 110. Distraction 83 is relative scoop 105 times distraction weight 107.

Descriptor valence values 66 may cumulatively reach considerable disparity between interest 62 and disinterest 61. In fact, to avoid potential user confusion, changes in display are not recommended until a threshold of disparity is reached. Variance of valence 66 may be adjusted using a smoothing function to keep valence values 66 within a specified range.

This invention facilitates valuating valance 66 to descriptors 2/64 and content 1. Descriptor valence aggregation 111 is the net summation of users' valence 66 to a single content descriptor 2. Descriptor valence aggregation 111 is calculated by summing valence 66 for a descriptor 2 from each user profile 63. Content valence aggregation 113 is the net summation of descriptor valence aggregation 111 for each descriptor 2 in a real or hypothetical content package 1. Content valence aggregation 113 yields statistical insight into which offered content achieves significant user valence 66, and may provide factor analysis about which content descriptors 2 have particular valence 66. Content valence aggregation 113 provides a statistical decision base for shifting content mix 11 on a site 40. Content valence aggregation 113 also provides a statistical decision base upon which new content 11 with favorable characteristics may be envisioned.

This invention facilitates categorizing users based upon valence 66 to content 11. User aggregation analysis flips valence aggregation analysis on its head by looking at which users are interested in particular content rather than which particular content interests users. Descriptor user aggregation 115 is compiling list of users with valence 66 to a single content descriptor 2. Using descriptor user aggregation 115 as a springboard, content user aggregation 117 is compiling a list of users with valence 66 for each descriptor 2 in a real or hypothetical content package 1. A cutoff threshold level of valence 66 may be specified for user aggregation analysis so that users with marginal valence 66 are not inappropriately corralled into a grouping. This applies to descriptor aggregation 115 and content user aggregation 117. For descriptor user aggregation 115, threshold cutoff applies to a user's valence 66 for a particular descriptor 2. For content user aggregation 117, threshold cutoff may be applied in a variety of ways, including weighting of single descriptors 2 based upon an assigned descriptor ordinal, or mixed weighting of multiple descriptors 2. In one embodiment, descriptor aggregation 115 provides sufficient threshold cutoff for content user aggregation 117.

In the preferred embodiment, both interest 62 and disinterest 61 are considered in the aggregation analyses described above. In alternative embodiments, only interest 62 or disinterest 61 may be considered.

The mutual exclusivity of descriptors 2 is an issue in the aggregation analyses described above. In the preferred embodiment, categorization 4 provides the basis for aggregation analyses. Attributes 5 are modifiers to categories 4, and cross category boundaries, but in context of categorization 4 may provide additional specification resolution, so an alternative embodiment may consider attributes 5 as well as categorization 4, in which case attributes 5 may be subsumed in the category 4 to which they apply. The descriptors 2 that serve as a basis for analysis should be mutually exclusive so as to avoid duplication: duplicate interest 62 accreditation or disinterest 61 debiting. If overlap exists in categorization 4, the overlap may be accounted for using statistical factoring and weighting. The level of hierarchical categorization 30 examined may vary depending upon the degree of resolution required for the analysis (assuming hierarchical categorization 30 is used).

This invention provides the basis to alter page 10 content and display based upon valence 66 to descriptors 2. Suggested content display changes based upon valence 66 include arranging menu items 54 and tabs 52 such that items of interest 62 are at optimal location 18; altering layout 16 of content packages 11 and otherwise changing scoop 33; and altering content 11 on a page 10. The nominal approach may be to elevate scoop 33 of content 11 with expressed interest 62 and obfuscate avoided 61 content, but a temporary 'testing' strategy may at times be employed to validate previously disclosed valence 66: enhance scoop 33 of disinterested 61 content 11 while obfuscating content 11 of interest 62. Altering layout 16 or content 11 may be expeditiously accomplished by using templates 55. The purpose of the invention is to guide organization and display of content 11 to optimize a user's utility of an information site 40, not preclude choice.

What is claimed is:

1. A method in a single computer or networked computers for tailoring display of multiple user-selectable content packages on a single computer screen display based upon previously encapsulated user valence, comprising the following steps:

assigning descriptors to content packages, said descriptors comprising at least in part a categorization and including attributes independent of categorization, wherein an attribute may apply to multiple categories;

displaying multiple said content packages on a single display of a user's computer screen;

recording any user selection of at least one said content package having said descriptors;

repeatedly displaying said multiple content packages and recording said user selections while dynamically encapsulating user valence at least in part based upon both the categorization and attributes of the content descriptors of a plurality of selected content packages.

2. The method according to claim 1, wherein said categorization of said descriptors is hierarchical.

3. The method according to claim 1, wherein encapsulating user valence solely based upon content package selection or absence of selection, with no user typing of text evaluated as part of encapsulating user valance.

4. The method according to claim 1, with the additional step of encapsulating user valence based upon both content package selection and user typing.

5. The method according to claim 4, wherein, as part of encapsulating user valence, said user typing is related to at least one content package descriptor.

6. The method according to claim 1, with the additional step of encapsulating user valence based upon both content package selection and user typing of at least one search word.

7. The method according to claim 1, whereby identifying user interest in at least one category and multiple attributes.

8. The method according to claim 1, with the additional step of selecting for display among other content packages at least one first content package having at least one attribute having been identified as being of user interest, but said first content package not having been identified as being in a category of user interest.

9. The method according to claim 1, with the additional step of identifying multiple categories of user interest and ranking said categories.

10. The method according to claim 1, with the additional step of ranking said attributes of interest.

11. The method according to claim 1, wherein at least one said displayed content package does not have text.

12. The method according to claim 1, wherein at least some attributes are categorized.

13. The method according to claim 12, wherein said attribute categorization is hierarchical.

14. The method according to claim 12, wherein said attribute categorization is independent of content descriptor categorization.

15. The method according to claim 1, wherein a template is used in placing at least some of the displayed content packages.

16. The method according to claim 1, with the additional step of accounting for the relative display value of at least one displayed and selected content package in encapsulating user valence.

17. The method according to claim 1, wherein said content package descriptors also include a measure of display value.

18. The method according to claim 1, with the additional step of accounting for distraction in encapsulating user valence.

19. The method according to claim 1, wherein a user identifies himself or herself prior to displaying content packages that form the basis for encapsulating user valence.

20. The method according to claim 1, with the additional step of encapsulating user discrimination using proximity as a basis.

21. The method according the claim 1, with the following additional steps:
evaluating relative potential user interest between at least a first and second content packages based upon encapsulated user valence;
determining a higher relative potential user interest in said first content package over said second content package;
displaying said first content package with less display value than said second content package.

22. The method according the claim 1, with the following additional steps:
evaluating relative potential user interest between at least a first and second content packages based upon encapsulated user valence;
determining a higher relative potential user interest in said first content package over said second content package;
displaying said first content package with more display value than said second content package.

23. The method of claim 1, with the following additional steps:
encapsulating user valence for multiple users;
ranking the relative interest of at least two descriptors to said multiple users.

24. The method of claim 23, wherein said descriptors are categories.

25. The method of claim 23, wherein said descriptors are attributes.

26. The method of claim 1, with the following additional steps:
encapsulating user valence for multiple users;
ranking the relative disinterest of at least two descriptors to said multiple users.

27. The method of claim 26, wherein said descriptors are categories.

28. The method of claim 26, wherein said descriptors are attributes.

29. The method according to claim 1, wherein content packages are provided by a server computer through a network to a client computer for selection by a user of said client computer.

30. The method according to claim 29, wherein data encapsulating user valence resides at least in part on said client computer.

31. The method-according to claim 29, wherein data encapsulating user valence resides entirely on said server computer.

32. The method according to claim 1, wherein user identification is kept on a client and accessed by a server prior to display of content.

33. The method according to claim 1, with the additional step of identifying user disinterest in at least one category.

34. The method according to claim 1, with the additional step of identifying user disinterest in at least one attribute.

35. The method according to claim 34, with the additional step of encapsulating user abstinence.

36. The method according to claim 1, wherein identifying user interest using at least in part a measure of decisiveness or consumption.

37. The method according to claim 1, with the additional step of altering display of content packages based upon said encapsulated user valence.

38. The method according to claim 37, wherein said display alteration includes at least in part removing from further display a content package previously displayed more than once to said user.

39. The method according to claim 37, wherein said display alteration includes altering the location or size in display of at least one previously displayed content package.

40. The method according to claim 37, wherein said display alteration includes altering the display of at least one previously displayed content package in a way that reduces said displayed content package's display value.

41. The method according to claim 37, wherein said display alteration includes altering the display of at least one previously displayed content package in a way that increases said displayed content package's display value.

42. The method according to claim 1, wherein at least one said single display comprises at least two content packages, each said content package having at least one category and at least one attribute, but with no common category or attribute.

43. The method according to claim 42, with the additional step of encapsulating user valence based upon both any category and attribute of any selected content package.

44. The method according to claim 42, with the additional step of encapsulating user valence based upon both any category and attribute of any content package not selected.

45. The method according to claim 1, wherein said content package descriptors are non-quantitative.

46. A method in a single computer or networked computers for tailoring display of multiple user-selectable content packages on a single computer screen display based upon previously encapsulated user valence, comprising the following steps:

assigning descriptors to content packages, said descriptors comprising at least in part hierarchical categorization and including attributes independent of categorization, wherein an attribute may apply to multiple categories;

repeatedly displaying multiple content packages on a single display of a first user's computer screen, at first without regard to the specific user, then at least in part accounting for encapsulated user valence, as follows;

recording any user selection of any content package having said descriptors;

dynamically encapsulating user valence at least in part based upon both the categories and attributes of the content descriptors of a plurality of said selected content packages, whereby identifying user interest in at least one category and multiple attributes.

47. The method according to claim 46, wherein encapsulating user valence based upon content package selection and absence of selection.

48. The method according to claim 47, with the additional step of determining a descriptor of least interest to said first user.

49. The method according to claim 46, with no user typing of text evaluated in encapsulating user valance.

50. The method according to claim 46, with the additional step of incorporating into encapsulated user valence typing by said user.

51. The method according to claim 50, wherein said user typing is related to at least one content package descriptor.

52. The method according to claim 46, with the additional step of repeatedly displaying multiple content packages having overlapping descriptors, at least one descriptor having been identified of interest to said first user.

53. The method according to claim 46, with the additional step of altering display of content packages to said first user based upon encapsulated user valence.

54. The method according to claim 46, with the additional step of identifying at least one other second user with an interest in at least one descriptor of interest to said first user.

55. The method according to claim 54, with the additional step of determining descriptor valence aggregation for at least one descriptor of interest to both said first and second users.

56. The method according to claim 55, with the additional step of determining content valence aggregation for at least one content package.

57. The method according to claim 55, with the additional step of determining content valence aggregation for at least one content package that has not been displayed to said first user.

58. The method according to claim 46, with the additional step of determining a descriptor of most interest to said first user.

59. The method according to claim 58, wherein said descriptor of most interest is a category.

60. The method according to claim 58, wherein said descriptor of most interest is an attribute.

\* \* \* \* \*